(12) United States Patent
Jones et al.

(10) Patent No.: US 11,554,823 B2
(45) Date of Patent: Jan. 17, 2023

(54) SLEEVE BEARING HAVING A FLARED END

(71) Applicant: Caterpillar Inc., Peoria, IL (US)

(72) Inventors: Benjamin I. Jones, Bartonville, IL (US); Jianjun Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 603 days.

(21) Appl. No.: 16/564,305

(22) Filed: Sep. 9, 2019

(65) Prior Publication Data
US 2021/0070384 A1 Mar. 11, 2021

(51) Int. Cl.
*B62D 55/088* (2006.01)
*B62D 55/21* (2006.01)
*F16C 17/02* (2006.01)

(52) U.S. Cl.
CPC ........... *B62D 55/088* (2013.01); *B62D 55/21* (2013.01); *F16C 17/02* (2013.01); *F16C 2326/20* (2013.01)

(58) Field of Classification Search
CPC ...... B62D 55/088; B62D 55/21; B62D 55/15; F16C 17/02; F16C 2326/20
See application file for complete search history.

(56) References Cited

U.S. PATENT DOCUMENTS

| | | | |
|---|---|---|---|
| 3,744,860 A * | 7/1973 | Casey | F16C 17/10 384/385 |
| 4,083,610 A * | 4/1978 | Kruchowski | B62D 55/08 384/418 |
| 4,251,182 A | 2/1981 | Schroeder | |
| 5,803,558 A * | 9/1998 | Ketting | F16C 23/045 305/136 |
| 6,382,742 B1 * | 5/2002 | Hasselbusch | E02F 9/02 305/202 |
| 2002/0145336 A1 * | 10/2002 | Bottom | F16C 11/045 305/202 |
| 2006/0284485 A1 * | 12/2006 | Johannsen | B62D 55/21 305/203 |
| 2008/0141513 A1 | 6/2008 | Livesay | |
| 2012/0251267 A1 | 10/2012 | Kuppili et al. | |
| 2017/0050688 A1 * | 2/2017 | Oertley | B62D 55/32 |

FOREIGN PATENT DOCUMENTS

| | | |
|---|---|---|
| CN | 205446403 U | 8/2016 |
| DE | 102017218159 A1 | 4/2019 |
| WO | 2017030780 | 2/2017 |

* cited by examiner

*Primary Examiner* — Jason R Bellinger
*Assistant Examiner* — Emily G. Castonguay
(74) *Attorney, Agent, or Firm* — Harrity & Harrity LLP (57) ABSTRACT

A cartridge pin assembly in a track chain assembly includes a sleeve bearing having a flared end.

11 Claims, 6 Drawing Sheets

SLEEVE BEARING HAVING A FLARED END

TECHNICAL FIELD

The present disclosure relates to a sleeve bearing used in a track chain assembly of an endless undercarriage drive employed by earth moving, construction and mining equipment and the like. Specifically, the present disclosure relates to a sleeve bearing that is configured to contact a link of the track chain assembly and withstand thrust forces without easily deforming, decreasing the amount maintenance necessary for the track chain assembly.

BACKGROUND

Earth moving, construction and mining equipment and the like are often used in rough, off-road terrain. These machines often employ an endless drive with track shoes attached to track chain assemblies that is better able to propel the machines in such environments over obstacles and uneven terrain, etc.

There can be a great deal of tension and loads on the track chain assembly. More specifically, the load exerted on the bushings and track pins of the track chain by the sprocket may cause these components, especially the bushing to become worn or fatigued. For example, high thrust loads may be exerted on the sleeve bearing that may cause an end of the sleeve bearing to mushroom or otherwise deform. Consequently, the space between the track link and an outer bushing of the track chain assembly might decrease over time, and the seal located in this space for holding lubricant near areas of friction may become damaged, allowing the lubricant to leak out. This may lead to wear problems and undesirable downtime for the machine while the track chain assembly is being maintained.

Prior designs for sleeve bearings are not directed to alleviate the aforementioned problems. For example, DE102017218159A1 discloses a sliding bearing that is preferably made from plastic or graphite and is meant to reduce friction. Therefore, it is not intended to take thrust loads or be used in a track chain assembly that is lubricated and sealed.

Accordingly, a track chain assembly that is lubricated and sealed while also being less prone to maintenance is desirable.

SUMMARY

A sleeve bearing according to an embodiment of the present disclosure may comprise an at least partially annular cylindrical body defining a cylindrical axis, a radial direction, and a circumferential direction. The at least partially annular cylindrical body may include a first radially inner circumferential surface, a first radially outer circumferential surface, a first free end and a second free end disposed along the cylindrical axis, and a first flared portion disposed proximate to the first free end along the cylindrical axis. The first flared portion may include a radially extending abutment surface, a first transitional surface connecting the first radially inner circumferential surface to the radially extending abutment surface, an angled surface forming a first external obtuse angle with the first radially outer circumferential surface, a second transitional surface connecting the radially extending abutment surface to the angled surface, and a third transitional surface connecting the angled surface to the first radially outer circumferential surface.

A cartridge pin assembly according to an embodiment of the present disclosure may comprise a first collar including a first body defining a first bore with a first diameter and a second bore in communication with the first bore, the second bore having a second diameter that is greater than the first diameter, a second collar including a second body defining a third bore with a third diameter and a fourth bore that is in communication with the third bore, the fourth bore having a fourth diameter that is greater than the third diameter. The first bore and the third bore may be aligned, defining a common track pin bore longitudinal axis. A track pin may be disposed in the first bore and the third bore, the track pin defining a radial direction, and a circumferential direction. A first sleeve bearing may be disposed in the second bore radially and circumferentially about the track pin. The first sleeve bearing may include a first flared end disposed along the longitudinal axis.

A track chain assembly according to an embodiment of the present disclosure may comprise a first track member including a first track shoe portion, and a first forked portion extending upwardly from the first track shoe portion, the first forked portion including a first lug and a second lug, wherein the first lug defines a first hole defining a first hole diameter and a first hole axis, and a second hole defining a second hole diameter and a second hole axis. The second hole axis may be aligned with the first hole axis. A second track member may include a second track shoe portion, and a third lug extending upwardly from the second track shoe portion, the third lug defining a third hole defining a third hole diameter and a third hole axis that is aligned with the second hole axis. A cartridge pin assembly may be disposed in the first hole, the second hole and, the third hole. The cartridge pin assembly may include a first collar including a first body defining a first bore with a first diameter, and a second bore in communication with the first bore, the second bore having a second diameter that is greater than the first diameter. A second collar may include a second body defining a third bore with a third diameter and a fourth bore that is in communication with the third bore, the fourth bore having a fourth diameter that is greater than the third diameter. The first bore and the third bore may be aligned, defining a common track pin bore longitudinal axis. A track pin may be disposed in the first bore and the third bore. The track pin may include a cylindrical track pin body defining a radial direction, and a circumferential direction. A first sleeve bearing may be disposed in the second bore radially and circumferentially about the track pin. A bushing may be disposed radially and circumferentially about the track pin. A first seal assembly may be disposed in the second bore that is disposed radially and circumferentially about the first sleeve bearing and that is configured to contact the bushing and the first body of the first collar. The first sleeve bearing may include a first flared end disposed along the longitudinal axis that abuts the first body of the first collar, and the first flared end may be spaced a minimum clearance distance away from the first seal assembly.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100',100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a track chain assembly with a cartridge pin assembly having a sleeve bearing with a flared end according to various embodiments of the present disclosure will now be described. These various embodiments may reduce the likelihood that the track chain assembly will need to be replaced or need maintenance. That is to say, various track chain assemblies as described herein may be robust since the sleeve bearing is not easily deformed and can withstand thrust loads, helping to protect the adjacent seal from being crushed.

Figure 1:
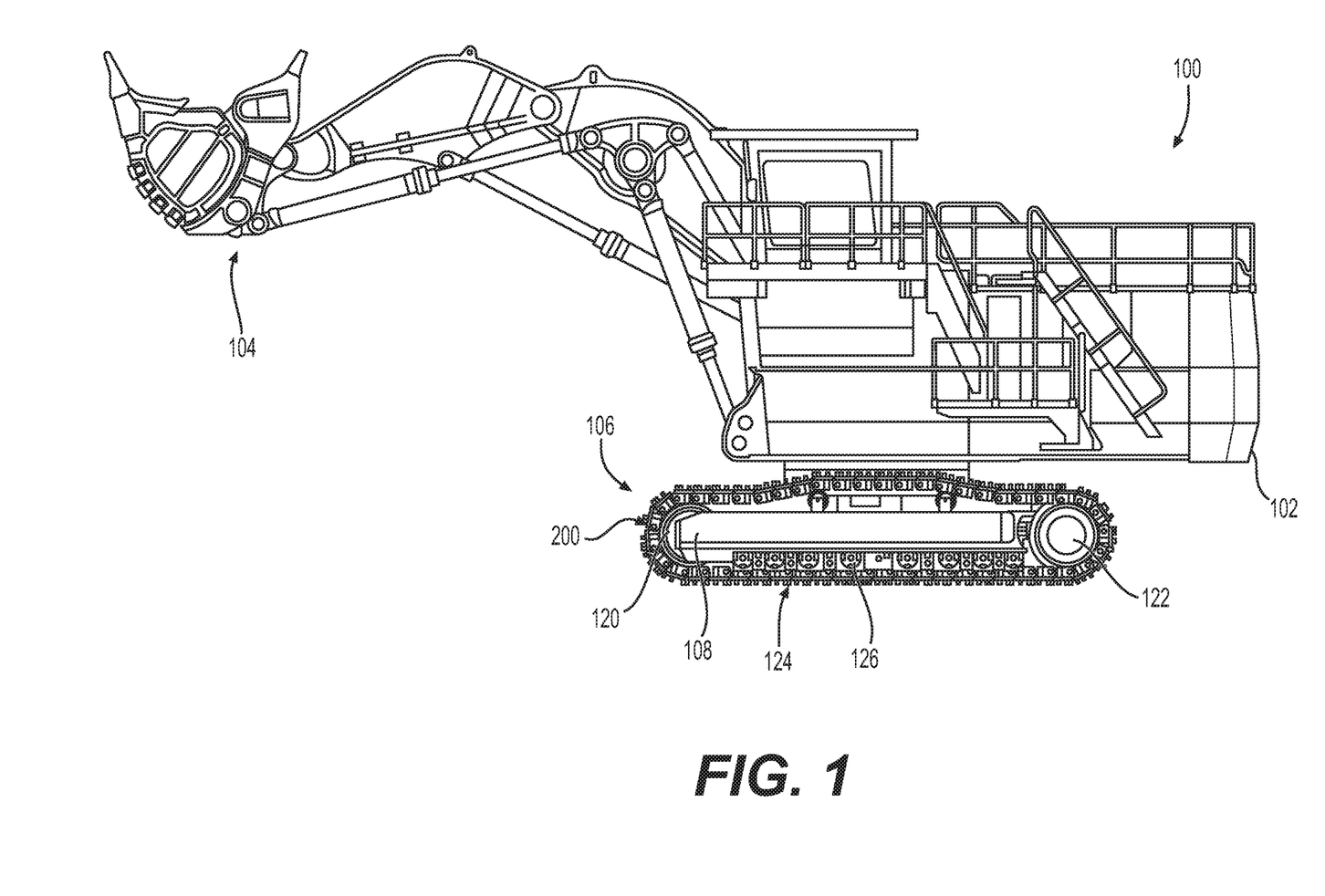
FIG. 1 is a perspective of a machine that may use various track chain assemblies with a cartridge pin assembly including a sleeve bearing having a flared end according to various embodiments of the present disclosure.

Referring to FIG. 1, there is shown a machine 100, according to one embodiment of the present disclosure. Machine 100 includes a track-type machine having a machine frame 102, and an implement system 104 coupled to frame 102. Frame 102 may be supported on and rotatable relative to a ground-engaging track system 106. Track system 106 includes a track roller frame 108, an idler 120, a drive sprocket 122, and a plurality of track rollers 126 mounted to track roller frame 108. A ground-engaging track 124 (may also be referred to as a track chain assembly 200) extends about idler 120, drive sprocket 122, track rollers 126, and potentially other rotatable track-engaging elements. Machine 100 is shown in the context of a mining machine, namely, a hydraulic mining shovel or the like where implement system 104 includes a hydraulically actuated implement system 104 structured to operate at least primarily at a working face of a mine.

Machine 100 could alternatively be a rope shovel, such as an electric rope shovel, or a variety of other types of equipment such as a tractor, a bulldozer or an excavator. Those skilled in the art will appreciate that certain mining machines, such as the illustrated hydraulic mining shovel, may be operated 90% of the time or more at fixed locations at a worksite, such as at a working face to capture, lift, and dump material into mining trucks or another conveyance mechanism, and thus are trammed only a minority of the time. Such mining machines can weigh up to 3 million pounds, or more, and despite the relative infrequency of tramming can subject their tracks to extreme wear, loading, and material deformation, for instance. It is generally desirable for tracks in such machines to have a service life in the tens of thousands of hours. As further discussed herein, machine 100, and track system 106 in particular, is structured for a service life and operational reliability, particularly with respect to track joints further discussed herein, that is extended relative to other strategies, with a reduced risk of premature failure or necessity for unexpected field service and machine downtime.

Focusing now on FIGS. 2 thru 4, the track chain assembly 200 according to various embodiments of the present disclosure may be described as follows.

The track chain assembly 200 may comprise a plurality of cartridge pin assemblies 300 used to create hinge joints 202 between a plurality of track members (e.g. a first track member 204 and a second track member 204').

Figure 2:
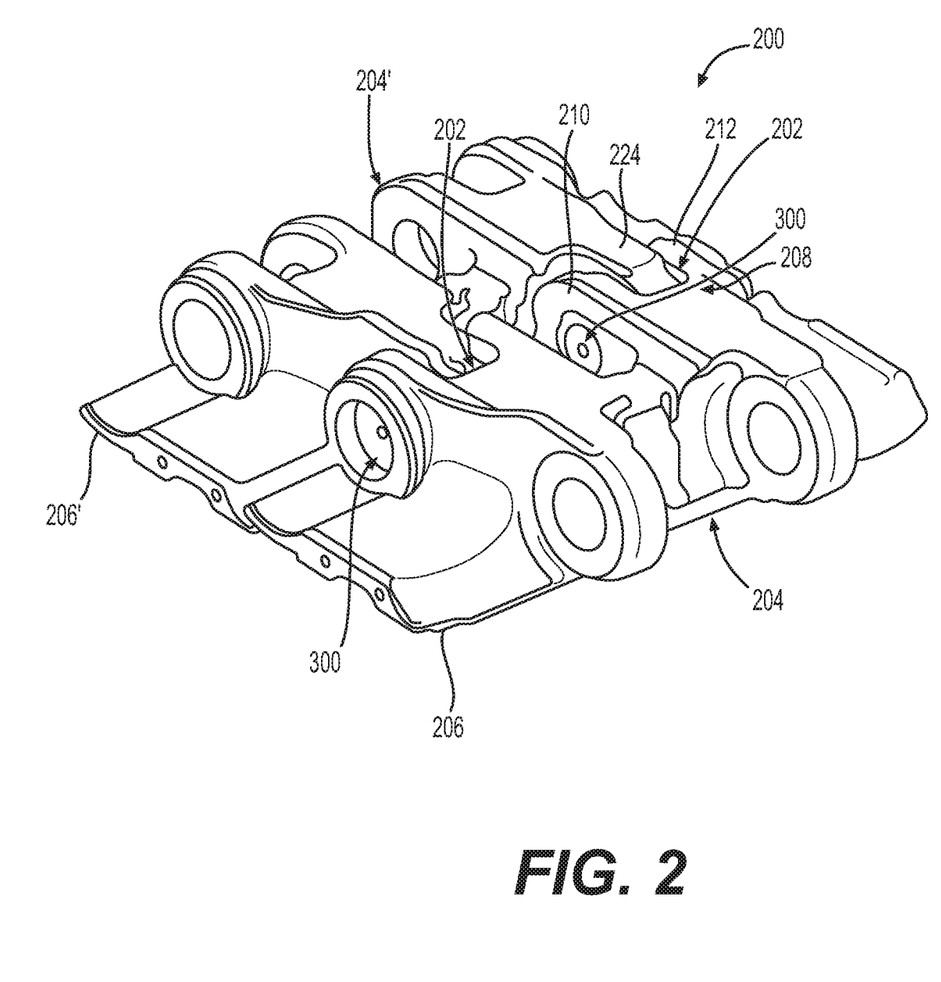
FIG. 2 is a perspective view of a portion of the track chain assembly with a cartridge pin assembly having a sleeve bearing(s) having a flared end according to an embodiment of the present disclosure shown in isolation from the machine of FIG. 1.
Figure 3:
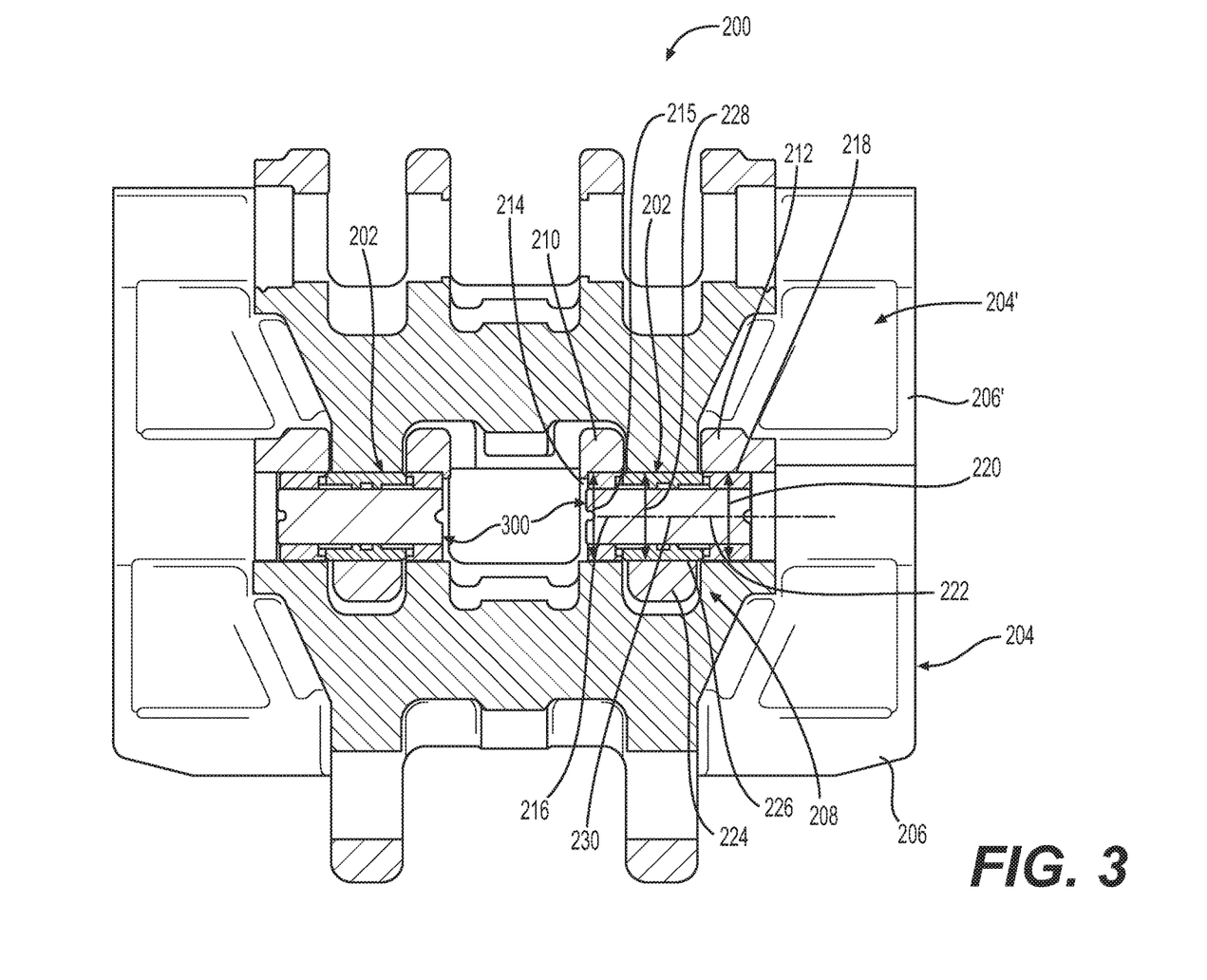
FIG. 3 is a top sectional view of the track chain assembly of FIG. 2 taken along a plane containing the longitudinal axis and the radial direction of the cartridge pin assembly of FIG. 2.

The first track member 204 and the second track member 204' may have identical configurations and may mate with each other by providing placing one in front of another along the track chain travel direction, allowing two parallel hinge joints 202 to be assembled as best seen in FIGS. 2 and 3. Other configurations are possible in other embodiments of the present disclosure including those where the track members have more or less than two hinge joints or are differently configured, etc.

Still looking at FIGS. 2 and 3, it can be understood that the first track member 204 may include a first track shoe portion 206, and a first forked portion 208 (acting like a track link) extending upwardly from the first track shoe portion 206. The first forked portion 208 may include a first lug 210, and a second lug 212. As best seen in FIG. 3, the first lug 210 defines a first hole 214 defining a first hole diameter 215 and a first hole axis 216, and the second lug 212 defines a second hole 218 defining a second hole diameter 220 and a second hole axis 222. The second hole axis 222 may be aligned with the first hole axis 216, allowing a cartridge pin assembly 300 to be inserted therein.

Similarly, the second track member 204' may include a second track shoe portion 206', and a third lug 224 (acting like a track link) extending upwardly from the second track shoe portion 206'. The third lug 224 may define a third hole 226 defining a third hole diameter 228, and a third hole axis 230 that is aligned with the second hole axis 222 when the first track member 204 and the second track member 204' are mated. Again, this construction allows the cartridge pin assembly 300 to be inserted therein to form a hinge joint 202.

It is to be understood that the track members may have track links that are separate from the track shoe such as when the track shoe is bolted or otherwise attached to the track links, etc. in other embodiments of the present disclosure.

Figure 4:
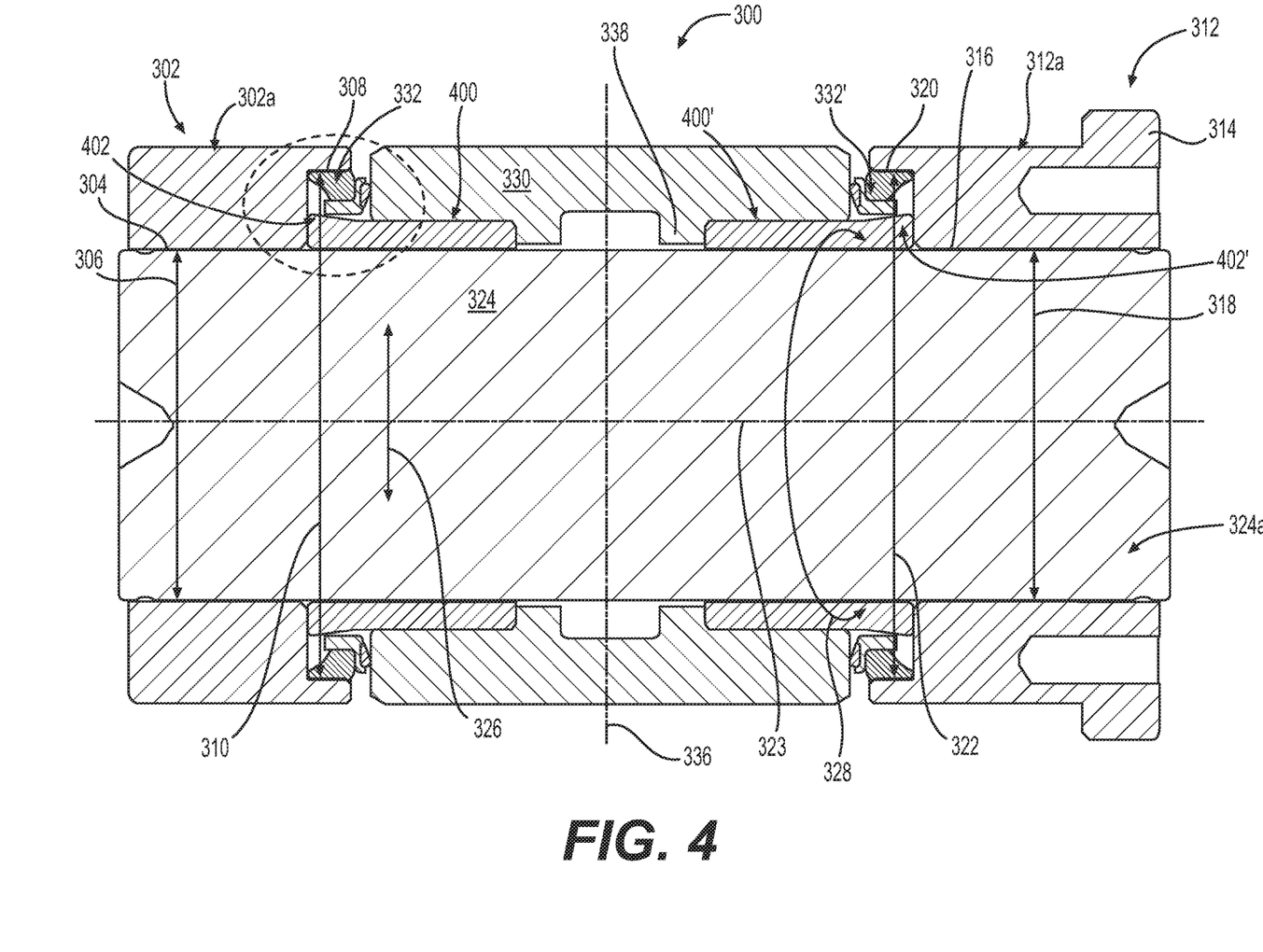
FIG. 4 is a sectional view of the cartridge pin assembly of FIG. 3 shown in isolation from the track chain assembly.

Turning now to FIG. 4, each of the plurality of cartridge pin assemblies 300 may include a first collar 302 including a first body 302a defining a first bore 304 with a first diameter 306, and a second bore 308 that is in communication with the first bore 304. The second bore 308 may have a second diameter 310 that is greater than the first diameter 306, forming a counterbore.

Likewise, the cartridge pin assembly 300 may also include a second collar 312 including a second body 312a defining a third bore 316 with a third diameter 318, and a fourth bore 320 with a fourth diameter 322 that is in communication with the third bore 316. The fourth bore 320 may have a fourth diameter 322 that is greater than the third diameter 318, forming another counterbore. The first bore 304 and the third bore 316 may be aligned and have the same sized diameter, defining a common track pin bore longitudinal axis 323 (coincident with second hole axis 222 in FIG. 3 when assembled). The second collar 312 may also have a stop portion 314 that is configured to locate the cartridge pin assembly 300 in the track chain assembly 200 as desired (this feature may be omitted). Other configurations are possible in other embodiments of the present disclosure.

Still referring to FIG. 4, a track pin 324 may be disposed in the first bore 304 and the third bore 316. The track pin 324 may have a cylindrical pin body 324a defining a radial direction 326, and a circumferential direction 328.

The cartridge pin assembly 300 may further comprise a first sleeve bearing 400 that is disposed in the second bore 308 and that is disposed radially and circumferentially about the track pin 324, and a bushing 330 that is disposed radially and circumferentially about the track pin 324, being configured to rotate about the track pin 324.

A first seal assembly 332 may be disposed in the second bore 308 such that the first seal assembly 332 is disposed radially and circumferentially about the first sleeve bearing 400. The first seal assembly 332 may be axially positioned such that the first seal assembly 332 is configured to contact the bushing 330 and the first body 302a of the first collar 302.

Figure 5:
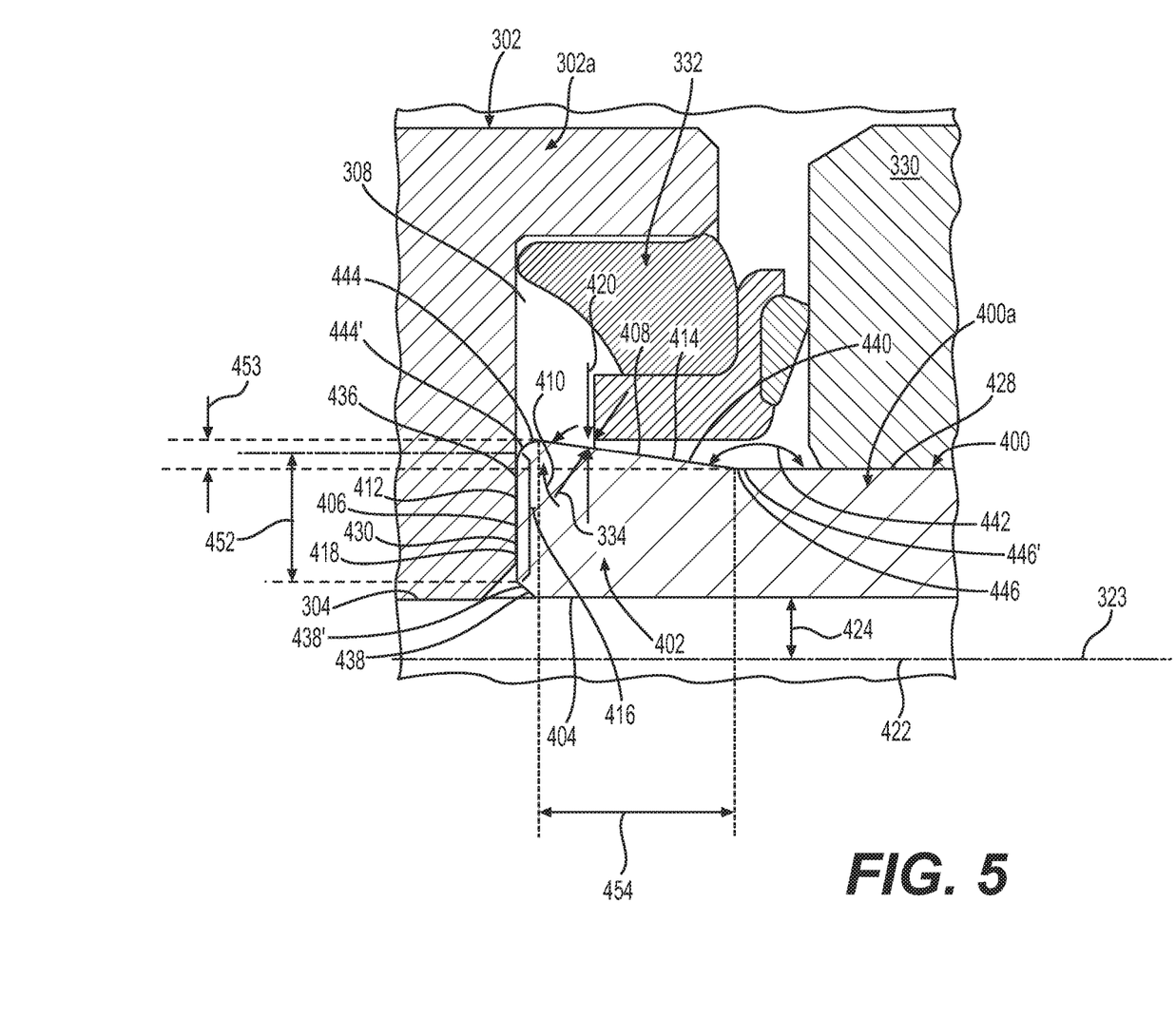
FIG. 5 is an enlarged view of a portion of FIG. 4 illustrating the interface between a track link and the flared end of the sleeve bearing more clearly.

As best seen in FIG. 5, the first sleeve bearing 400 may include a first flared end 402 disposed along the longitudinal axis 323 that abuts the first body 302a of the first collar 302. The first flared end 402 may be spaced a minimum clearance distance 334 from the first seal assembly 332 ranging from 3.0 mm to 5.0 mm in some embodiments of the present disclosure.

Hence, the function of the first seal assembly 332 may not be altered or inhibited by contacting the first flared end 402 of the first sleeve bearing 400 due to dimensional changes caused by loads exerted on the track chain assembly 200 or the cartridge pin assembly 300 in use for some embodiments of the present disclosure.

Referring back to FIG. 4, each of the plurality of cartridge pin assemblies 300 may define a longitudinal midplane 336 of the cartridge pin assembly 300, which may act as a plane of symmetry for at least some of the components of the cartridge pin assembly 300.

In such a case, the track chain assembly 200 may further comprise a second sleeve bearing 400' including a second flared end 402' disposed in the fourth bore 320 that is radially and circumferentially positioned about the track pin 324, and a second seal assembly 332' that is disposed in the fourth bore 320 that is positioned radially and circumferentially about the second sleeve bearing 400' and that is configured to contact the second body 312a of the second collar 312.

The bushing 320 may be disposed radially and circumferentially about the first sleeve bearing 400, the second sleeve bearing 400', and the track pin 324. The bushing 320 may also be disposed axially proximate to the first seal assembly 332 and to the second seal assembly 332', being configured to contact the first seal assembly 332 and the second seal assembly 332'. The bushing 330 may also include a projection 338 that extends radially inwardly and that is configured to axially contact the first sleeve bearing 400, and the second sleeve bearing 400', while also nearly contacting the track pin 324 radially, when contacting the first sleeve bearing 400, and the second sleeve bearing 400' radially. A lubrication reservoir is also shown between the projection 338 of the bushing 330 and the track pin 324. Other configurations of these features are possible or they may be omitted in other embodiments of the present disclosure.

As just alluded to herein, the second sleeve bearing 400' may be symmetrical to the first sleeve bearing 400 bout the longitudinal midplane 336, and the second seal assembly 400' may be symmetrical to the first seal assembly 332 about the longitudinal midplane 336. In fact, these components may constructed identically and may be used by rotating them one hundred eighty degrees about the longitudinal midplane 336 as shown in FIG. 4. Similarly, the bushing 330 may be symmetrical about the longitudinal midplane 336.

Other configurations and dimensions are possible in other embodiments of the present disclosure including those where the cartridge pin assembly 300 and its components are asymmetrical.

Looking at FIGS. 4 and 5 together, a cartridge pin assembly 300 that may be used in the track chain assembly 200 as just described may be characterized as follows.

In FIG. 4, the cartridge pin assembly 300 may comprise a first collar 302 that has a first body 302a defining a first bore 304 with a first diameter 306, and a second bore 308 that is in communication with the first bore 304. The second bore 308 may have a second diameter 310 that is greater than the first diameter 306, forming a counterbore.

The cartridge pin assembly 300 may further comprise a second collar 312 that has a second body 312a defining a third bore 316 with a third diameter 318, and a fourth bore 320 with a fourth diameter 322 that is in communication with the third bore 316. The fourth bore 320 may have a fourth diameter 322 that is greater than the third diameter 318, forming another counterbore. The first bore 304 and the third bore 316 are aligned, defining a common track pin bore longitudinal axis 323 as mentioned previously herein.

Thus, a track pin 324 is disposed in the first bore 304 and the third bore 316. The track pin 324 defines a radial direction 326, and a circumferential direction 328.

A first sleeve bearing 400 is disposed in the second bore radially and circumferentially about the track pin 324. The first sleeve bearing 400 includes a first flared end 402 disposed along the longitudinal axis 323.

The cartridge pin assembly 300 may further comprise a second sleeve bearing 400' including a second flared end 402' disposed in the fourth bore 320 radially and circumferentially about the track pin 324, a first seal assembly 332 that is disposed in the second bore 308 radially and circumferentially about the first sleeve bearing 400. The first seal assembly 332 is configured to contact the first collar 302.

Moreover, a second seal assembly 332' is disposed in the fourth bore 320 radially and circumferentially about the second sleeve bearing 400. The second seal assembly 332' is configured to contact the second collar 312.

A bushing 330 is disposed radially and circumferentially about the first sleeve bearing 400, the second sleeve bearing 400', and the track pin 324. The bushing 330 is disposed axially proximate to the first seal assembly 332, and to the second seal assembly 332', being configured to contact the first seal assembly 332 and the second seal assembly 332' (creating a fluid tight seal to seal lubricant in the cartridge pin assembly 300). The bushing 330 also includes a projection 338 that is configured to axially contact the first sleeve bearing 400 and the second sleeve bearing 400'.

As best seen in FIG. 5, the first flared end 402 includes a first radially inner circumferential surface 404, a first abutment surface 406, and a first inclined surface 408 forming a first internal acute angle 410 with the longitudinal axis 323 ranging from 70.0 degrees to 89.0 degrees (e.g. about 80 degrees).

In some embodiments, the first abutment surface 406 may be a first radially extending surface 412 (e.g. a planar surface). In such a case, the first abutment surface 406 contacts the first collar 302, forming a first interface region 416 defining a first interface region surface area 418 ranging from 14,000 mm² to 37,000 mm².

Similarly, in some embodiments, the first inclined surface 408 is a first ramp surface 414 (e.g. a conical surface). In such a case, the first seal assembly 332 may be disposed radially, circumferentially, and axially proximate to the first inclined surface 408. A first radial clearance distance 420 may be provided between the first inclined surface 408 and the first seal assembly 332 ranging from 3.0 mm to 5.0 mm.

As alluded to earlier herein, the second sleeve bearing 400' may also have a second flared end 402' that is identically configured as the first flared end 402 of the first sleeve bearing 400 (see FIG. 4).

Any of these configurations or dimensions may be different in other embodiments of the present disclosure.

A first sleeve bearing 400 that may be used in the cartridge pin assembly 300 just described will now be described with reference to FIGS. 5 thru 8.

The first sleeve bearing 400 may comprise an at least partially annular cylindrical body 400a defining a cylindrical axis 422, a radial direction 424, and a circumferential direction 426.

The at least partially annular cylindrical body 400a may include a first radially inner circumferential surface 404, a first radially outer circumferential surface 428, a first free end 430, and a second free end 432 disposed along the cylindrical axis 422. A first flared portion 434 may be disposed proximate to the first free end 430 along the cylindrical axis 422.

The first flared portion 434 may include a radially extending abutment surface 436, a first transitional surface 438 connecting the first radially inner circumferential surface 404 to the radially extending abutment surface 436, an angled surface 440 forming a first external obtuse angle 442 with the first radially outer circumferential surface 428, a second transitional surface 444 connecting the radially extending abutment surface 436 to the angled surface 440, and a third transitional surface 446 connecting the angled surface 440 to the first radially outer circumferential surface 428.

In some embodiments, the first external obtuse angle 442 may range from 160.0 degrees to 179.0 degrees (e.g. about 170 degrees). Other values for this angle are possible in other embodiments of the present disclosure.

As best seen in FIG. 5, the first transitional surface 438 may be a first chamfer 438', the second transitional surface 444 may be a second chamfer 444', and the third transitional surface 446 may be a radius 446'. Other configurations are possible for these features in other embodiments of the present disclosure.

Figure 8:
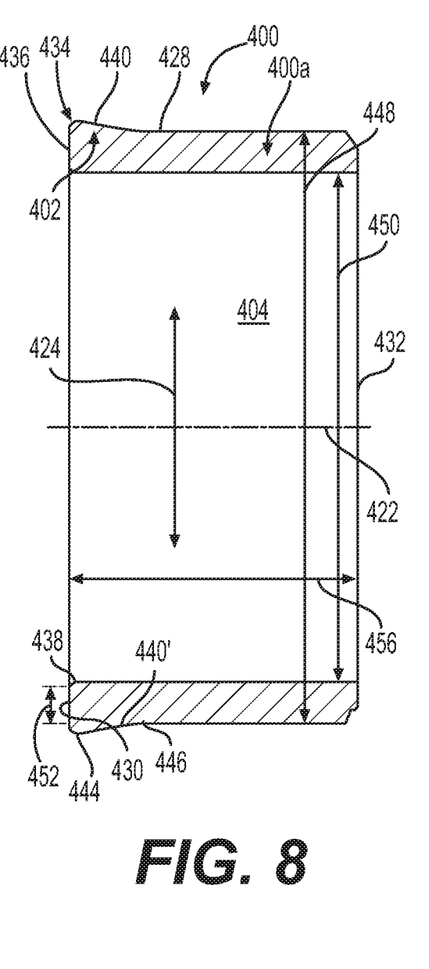
FIG. 8 is a side sectional view of the sleeve bearing of FIG. 7.

Looking at FIG. 8, the first radially outer circumferential surface 428 may define an outer diameter 448 of the first sleeve bearing 400 ranging from 80 mm to 200 mm in some embodiments. Also, the first radially inner circumferential surface 404 may define an inner diameter 450 of the first sleeve bearing 400 ranging from 60 mm to 180 mm in some embodiments. The at least partially annular cylindrical body 400a may define a longitudinal length 456 measured from the first free end 430 to the second free end 432 ranging from 80.0 mm to 250.0 mm. These dimensions may be different in other embodiments of the present disclosure.

Figure 6:
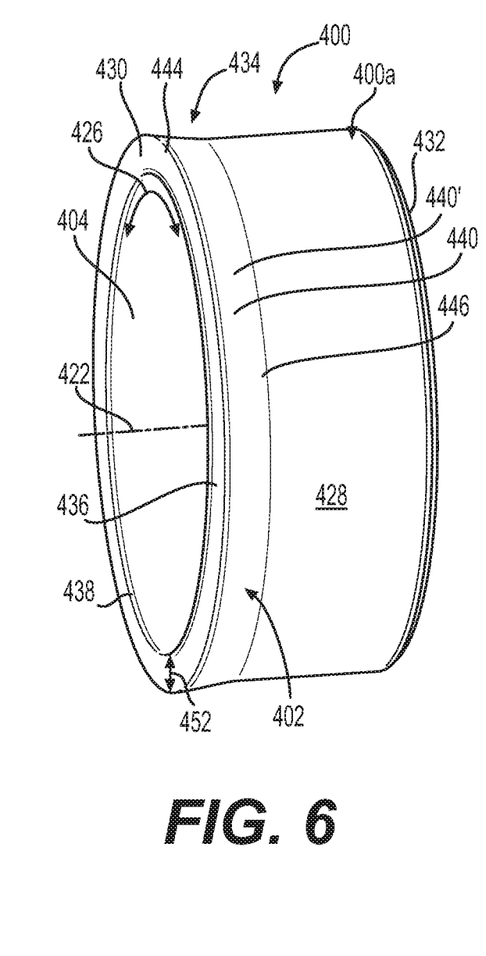
FIG. 6 is a perspective view of the sleeve bearing of FIG. of 3 shown in isolation from the track chain assembly.
Figure 7:
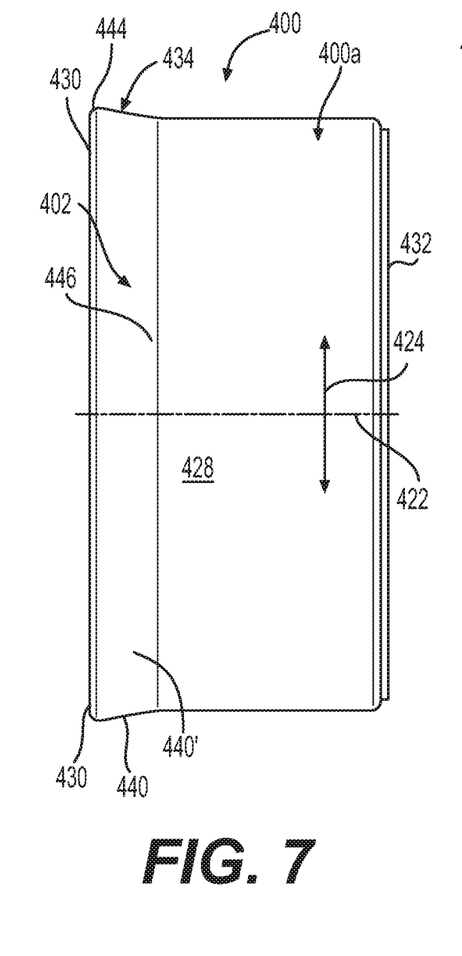
FIG. 7 is a side view of the sleeve bearing of FIG. 6.

As seen in FIGS. 5, 6, and 8, the radially extending abutment surface 436 may define a radial height 452 measured radially from the first transitional surface 438 to the second transitional surface 444 ranging from 10.0 mm to 30.0 mm.

Looking at FIG. 5, the angled surface 440 may be a conical surface 440'. The cross-section of the conical surface 440' may define a height 453 measured from the second transitional surface 444 to the third transitional surface 446 along the radial direction 424 ranging from 3.0 mm to 9.5 mm, and a width 454 measured from the second transitional surface 444 to the third transitional surface 446 along the cylindrical axis 422 ranging from 18.0 mm to 54.0 mm. These features and dimensions may be different in other embodiments of the present disclosure.

The various components of the track chain assembly 200, and cartridge pin assembly 300 may be manufactured using any suitable manufacturing process or material. The track members may be forged, cast, or machined using steel, cast iron, steel-cast iron, etc. The first sleeve bearing 400 may also be made from steel, stainless steel, etc.

INDUSTRIAL APPLICABILITY

In practice, a track chain assembly, a cartridge pin assembly (or subassembly thereof) and/or a sleeve bearing according to any embodiment described herein may be sold, bought, manufactured or otherwise obtained in an OEM (Original Equipment Manufacturer) or after-market context.

For example, track chain assemblies already in the field may be retrofitted with a sleeve bearing with a flared end or a cartridge pin assembly with a sleeve bearing with a flared end. Also, machines already in the field may be retrofitted with track chain assemblies using a cartridge pin assembly or a sleeve bearing with a flared end according to various embodiments of the present disclosure.

Alternatively, the machine may be originally sold with a track chain assembly with a cartridge pin assembly or sleeve bearing with a flared end according to various embodiments of the present disclosure. Then, the cartridge pin assembly or the sleeve bearing with a flared end may be supplied as a replacement part, etc.

The inventors of the present application have performed FEA (Finite Element Analysis) on the cartridge pin assembly using a sleeve bearing with a flared end as described herein. The stresses were reduced due to the increased contact area. Consequently, deformation of the sleeve bearing or the collar may be reduced. This may prolong the life of the cartridge pin assembly as desired, decreasing the frequency of maintenance.

The various embodiments discussed herein may be scaled up or down depending on the application. To that end, various ratios of dimensions may be provided in still further embodiments of the present disclosure that may provide satisfactory performance. For example, a ratio of the outer diameter of the sleeve bearing to the radial height of the radially extending abutment surface may range from 10.0 to 15.0 in certain embodiments. Similarly, a ratio of the longitudinal length of the sleeve bearing to the height of the conical surface may range from 28.0 to 36.0, while a ratio of the longitudinal length to the width of the conical surface may range from 3.0 to 5.0 in certain embodiments. Also, a ratio of the first interface region surface area to the inner diameter may range from 300.0 mm to 400.0 mm in certain embodiments. Other ranges for these ratios are possible in other embodiments of the present disclosure.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A cartridge pin assembly comprising:
   a first collar including:
      a first body defining a first bore with a first diameter and a second bore in communication with the first bore, the second bore having a second diameter that is greater than the first diameter;
   a second collar including:
      a second body defining a third bore with a third diameter and a fourth bore that is in communication with the third bore,
         the fourth bore having a fourth diameter that is greater than the third diameter, and
         the first bore and the third bore are aligned, defining a common track pin bore longitudinal axis;
   a track pin disposed in the first bore and the third bore, the track pin defining a radial direction and a circumferential direction; and
   a first sleeve bearing disposed in the second bore radially and circumferentially about the track pin,
      wherein the first sleeve bearing includes a first flared end disposed along the longitudinal axis,
      wherein the first flared end is spaced a first distance from a seal assembly at a first point and is spaced a second distance from the seal assembly at a second point, and
      wherein the first distance is different from the second distance.

2. The cartridge pin assembly of claim 1, further comprising:
   a second sleeve bearing including a second flared end disposed in the fourth bore radially and circumferentially about the track pin,
   a first seal assembly that is disposed in the second bore radially and circumferentially about the first sleeve bearing and that is configured to contact the first collar, the seal assembly being the first seal assembly,
   a second seal assembly that is disposed in the fourth bore radially and circumferentially about the second sleeve bearing and that is configured to contact the second collar, and
   a bushing disposed radially and circumferentially about the first sleeve bearing, the second sleeve bearing, and the track pin,
      the bushing also being disposed axially proximate to the first seal assembly and to the second seal assembly,
      the bushing being configured to contact the first seal assembly and the second seal assembly, and
      the bushing including a projection that is configured to axially contact the first sleeve bearing and the second sleeve bearing.

3. The cartridge pin assembly of claim 1, wherein the first flared end includes a radially inner circumferential surface, an abutment surface, and an inclined surface forming an internal acute angle with the longitudinal axis ranging from 70.0 degrees to 89.0 degrees.

4. The cartridge pin assembly of claim 3, wherein the abutment surface is a radially extending surface.

5. The cartridge pin assembly of claim 3, wherein the inclined surface is a ramp surface.

6. The cartridge pin assembly of claim 5, wherein the first seal assembly is disposed radially, circumferentially, and axially proximate to the inclined surface.

7. The cartridge pin assembly of claim 3,
   wherein the abutment surface contacts the first collar, forming an interface region defining an interface region surface area ranging from 14,000 mm$^2$ to 37,000 mm$^2$,
   wherein the radially inner circumferential surface defines an inner diameter of the first sleeve bearing, and
   wherein a ratio of the first interface region surface area to the inner diameter ranges from 300.0 mm to 400.0 mm.

8. The cartridge pin assembly of claim 3, wherein the cartridge pin assembly defines a radial clearance distance between the inclined surface and the seal assembly ranging from 3.0 mm to 5.0 mm.

9. The cartridge pin assembly of claim 1, further comprising:
   a second sleeve bearing including a second flared end that is identically configured as the first flared end.

10. A track chain assembly comprising:
    a first track member including
       a first track shoe portion; and
       a first forked portion extending upwardly from the first track shoe portion,
          the first forked portion including a first lug and a second lug,
             wherein the first lug defines a first hole defining a first hole diameter and a first hole axis, and
             wherein the second lug defines a second hole defining a second hole diameter and a second hole axis,
                the second hole axis being aligned with the first hole axis;
    a second track member including
       a second track shoe portion; and
       a third lug extending upwardly from the second track shoe portion,
          the third lug defining a third hole defining a third hole diameter and a third hole axis that is aligned with the second hole axis; and a cartridge pin assembly disposed in the first hole, the second hole, and the third hole,
the cartridge pin assembly including
a first collar including a first body defining a first bore with a first diameter and a second bore in communication with the first bore,
the second bore having a second diameter that is greater than the first diameter;
a second collar including a second body defining a third bore with a third diameter and a fourth bore that is in communication with the third bore,
the fourth bore having a fourth diameter that is greater than the third diameter;
a track pin disposed in the first bore and the third bore, the track pin including a cylindrical track pin body defining a radial direction and a circumferential direction;
a first sleeve bearing that is disposed in the second bore radially and circumferentially about the track pin;
a bushing that is disposed radially and circumferentially about the track pin; and
a first seal assembly that is disposed in the second bore is configured to contact the bushing and the first body of the first collar,
wherein the first sleeve bearing includes a first flared end,
wherein the first flared end is spaced a first clearance distance away from the first seal assembly at a first point and is spaced a second clearance distance away from the first seal assembly at a second point, and
wherein the first clearance distance is different from the second clearance distance.

11. The track chain assembly of claim 10,
wherein the cartridge pin assembly defines a longitudinal midplane of the cartridge pin assembly,
the cartridge pin assembly further comprising:
a second sleeve bearing including a second flared end disposed in the fourth bore radially and circumferentially about the track pin; and
a second seal assembly that is disposed in the fourth bore and is configured to contact the second body of the second collar,
wherein the bushing is disposed radially and circumferentially about the first sleeve bearing, the second sleeve bearing, and the track pin,
wherein the bushing is configured to contact the first seal assembly and the second seal assembly,
wherein the bushing includes a projection that extends radially inwardly and that is configured to axially contact the first sleeve bearing, and the second sleeve bearing,
wherein the second sleeve bearing is symmetrical to the first sleeve bearing about the longitudinal midplane,
wherein the second seal assembly is symmetrical to the first seal assembly about the longitudinal midplane, and
wherein the bushing is symmetrical about the longitudinal midplane.

* * * * *